US012768518B1

(12) United States Patent
Boress et al.

(10) Patent No.: US 12,768,518 B1
(45) Date of Patent: Oct. 20, 2026

(54) THREADED INSERT FOR AN AIRFIELD LIGHT FIXTURE

(71) Applicant: GBA COMPONENTS, LLC, Bensenville, IL (US)

(72) Inventors: Howard Boress, Lake in the Hills, IL (US); Thomas Grisaffi, Chicago, IL (US)

(73) Assignee: GBA COMPONENTS, LLC, Bensenville, IL (US)

( * ) Notice: Subject to any disclaimer, the term of this patent is extended or adjusted under 35 U.S.C. 154(b) by 0 days.

(21) Appl. No.: 19/293,900

(22) Filed: Aug. 7, 2025

Related U.S. Application Data

(63) Continuation of application No. 18/423,955, filed on Jan. 26, 2024, now Pat. No. 12,404,992.

(60) Provisional application No. 63/441,522, filed on Jan. 27, 2023.

(51) Int. Cl.

| | |
|---|---|
| ***F21V 17/12*** | (2006.01) |
| ***F21S 8/02*** | (2006.01) |
| ***F21V 15/015*** | (2006.01) |
| ***F21V 17/06*** | (2006.01) |
| *F21W 111/06* | (2006.01) |

(52) U.S. Cl.
CPC .............. *F21V 17/12* (2013.01); *F21S 8/022* (2013.01); *F21V 15/015* (2013.01); *F21V 17/06* (2013.01); *F21W 2111/06* (2013.01)

(58) Field of Classification Search
CPC ..... F21W 2111/06; F21V 17/06; F21V 17/12; F21V 15/015; F21S 8/022
See application file for complete search history.

(56) References Cited

U.S. PATENT DOCUMENTS

| | | | |
|---|---|---|---|
| 3,015,717 | A | 1/1962 | Angler |
| 6,550,931 | B1 | 4/2003 | Olson, Jr. |
| 8,313,208 | B2 | 11/2012 | Tyson et al. |
| 9,279,578 | B2 | 3/2016 | Bertin |
| 9,696,020 | B2 | 7/2017 | Salazar et al. |
| 10,843,813 | B2 | 11/2020 | Ishikiriyama |
| 2017/0356629 | A1 | 12/2017 | Baeten et al. |

FOREIGN PATENT DOCUMENTS

| | | | | |
|---|---|---|---|---|
| EP | 1936257 | B1 | 5/2011 | |
| EP | 2808261 | A1 * | 12/2014 | ................ B64F 1/20 |
| WO | WO-2009077010 | A1 * | 6/2009 | .............. F21V 29/89 |
| WO | WO-2013182659 | A1 * | 12/2013 | .............. F21V 29/70 |

(Continued)

OTHER PUBLICATIONS

Omulv Sonsteby, P.C.; IPRF Research Report, Constructing In-Pavement Lighting, Portland Cement Concrete Pavement; Innovative Pavement Research Foundation; Mar. 14, 2028; 77 pages.

(Continued)

*Primary Examiner* — Anabel Ton
(74) *Attorney, Agent, or Firm* — Vedder Price P.C.

(57) ABSTRACT

A threaded insert for an air field light fixture. The threaded insert is manufactured to repair or replace the threading in such light fixtures by providing the airfield light fixture with a replacement threaded insert to permit quick and simple repair upon the occurrence of a broken bolt or stripped threading.

6 Claims, 6 Drawing Sheets

(56) References Cited

FOREIGN PATENT DOCUMENTS

WO 2014111541 A1 7/2017

OTHER PUBLICATIONS

ADB Safegate; Installation & Mounting: Light Base Data Sheet; L-867/L-868; DS-2012-v1.0; 7 pages.
U.S. Department of Transportation Advisory Circular; Federal Aviation Administration; Nov. 6, 2015; 50 pages.
Memorandum; Khalil E. Kodsi, P.E.; Federal Aviation Administration; 25 pages.

* cited by examiner

THREADED INSERT FOR AN AIRFIELD LIGHT FIXTURE

RELATED APPLICATIONS AND INCORPORATION BY REFERENCE

This application claims benefit to U.S. Non-Provisional patent application Ser. No. 18/423,955, filed Jan. 26, 2024 which claims priority to U.S. Provisional Patent Application Ser. No. 63/441,522, filed Jan. 27, 2023. The foregoing applications are hereby incorporated by reference.

FIELD OF DISCLOSURE

The present disclosure generally relates to a threaded insert for an airfield light fixture.

BACKGROUND

Inset light fixtures have long been used at airports to provide lighting for both airport runways and taxiways. Typically each light fixture includes a container which houses electrical components and is embedded into the concrete. Typically each light fixture includes a cover which is mountable to the top of the container with plurality of bolts which extend into threaded openings in the container.

Due to its exposure to the elements, the light fixture and its corresponding bolts undergo a significant amount of wear and tear. Bolts and light fixtures often rust or deteriorate in the normal course of operation. In addition, maintenance of these light fixtures requires the removal of the bolts in order to gain access to the container and electrical components. A common problem with these light fixtures is that the bolts rust and break within the threaded opening of the container or the bolts strip the threading upon their removal.

In such case, the threaded openings of the container are blocked and/or damaged and require repair before the light fixture can be resecured within the pavement. This often requires broken bolts to be removed and damaged threadings be rethreaded on site.

U.S. Pat. No. 6,550,931 discloses a threaded insert for use with an airfield light fixture. However, this patent discloses removable inserts that are used in connection with each and every bolt of the device. This prior reference discloses a base can which specifically requires the inserts in the disclosure in order to function. The disclosure of the '931 patent is not directed toward an insert that can replace any stripped threading in airfield light fixtures. Instead the '931 Patent is directed to inserts which are specially created for the disclosed light fixture.

A long-felt, but unmet, need exists for a simple and easy way to re-thread or repair the threaded holes within any air field light fixture container.

SUMMARY OF DISCLOSURE

This summary is provided to introduce a selection of concepts in a simplified form further described in the detailed description of the disclosure. This summary is not intended to identify key or essential inventive concepts of the claimed subject matter, nor is it intended for determining the scope of the claimed subject matter.

A long-felt, but unmet, need exists for a simple and easy method and device to re-thread and repair damaged threadings within an airfield light fixture.

According to the present invention, this object is achieved by providing the airfield light fixture with a replacement threaded insert to permit quick and simple repair upon the occurrence of a broken bolt or stripped threading.

Embodiments of the present disclosure address one or more of the disadvantages and problems discussed above.

DETAILED DESCRIPTION

Figure 1:
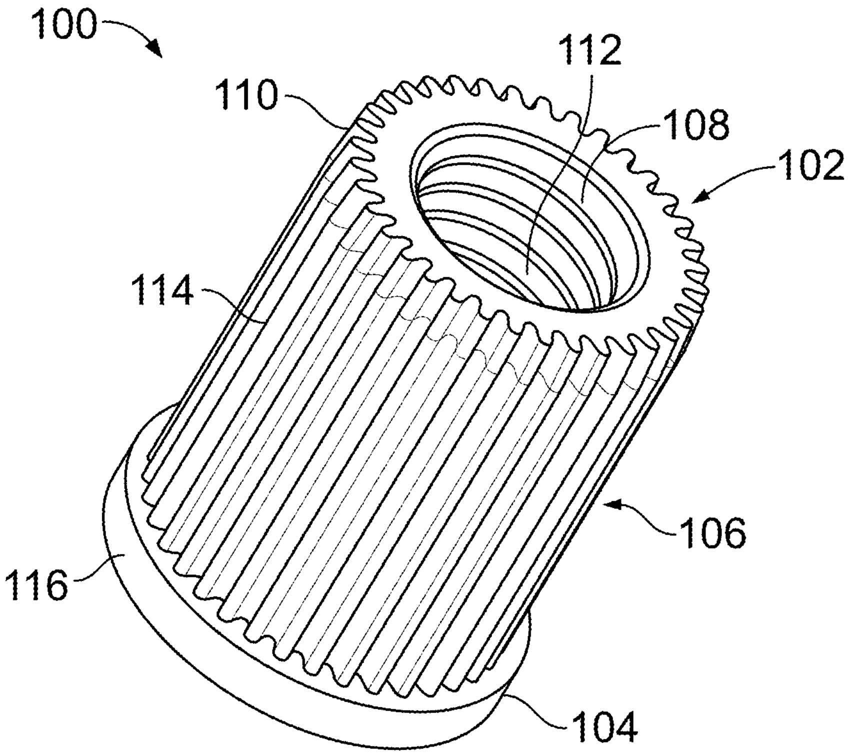
FIG. 1 depicts a perspective view of the threaded insert.
Figure 2:
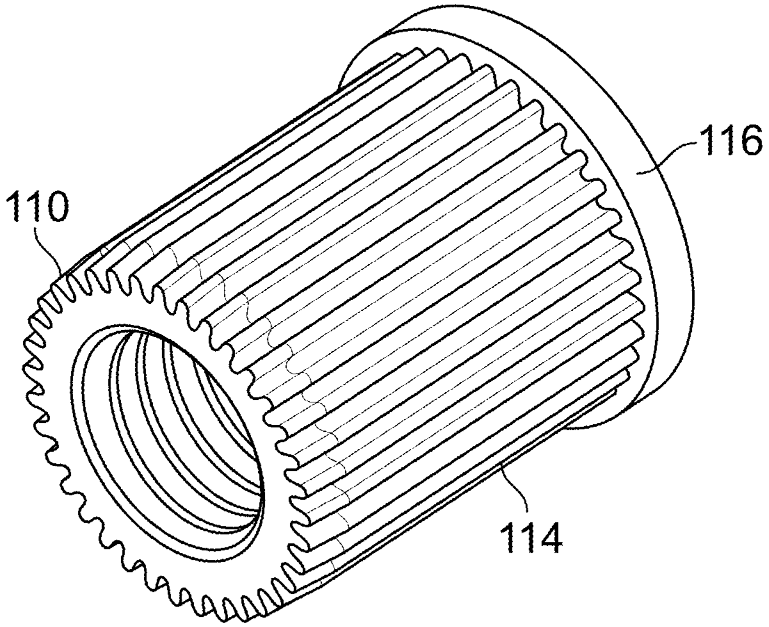
FIG. 2 depicts a second perspective view of the threaded insert.
Figure 3:
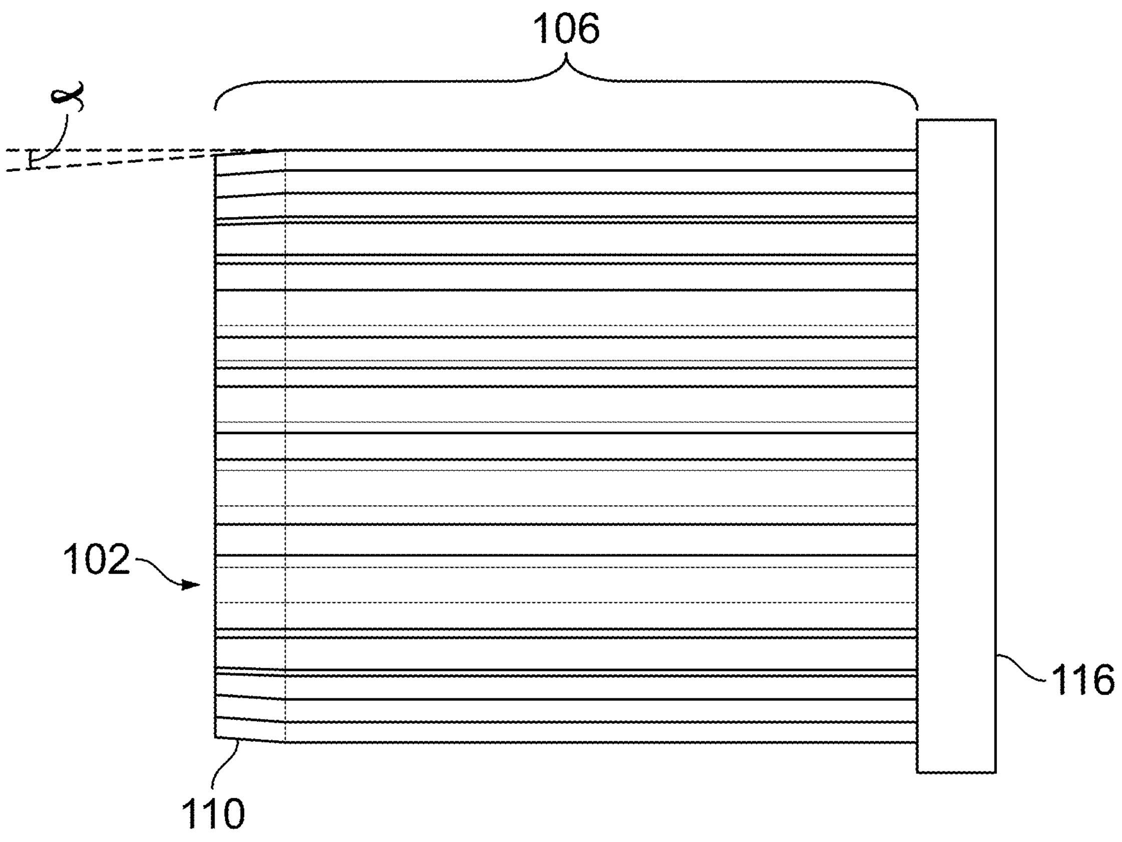
FIG. 3 depicts a side view of the threaded insert.
Figure 4:
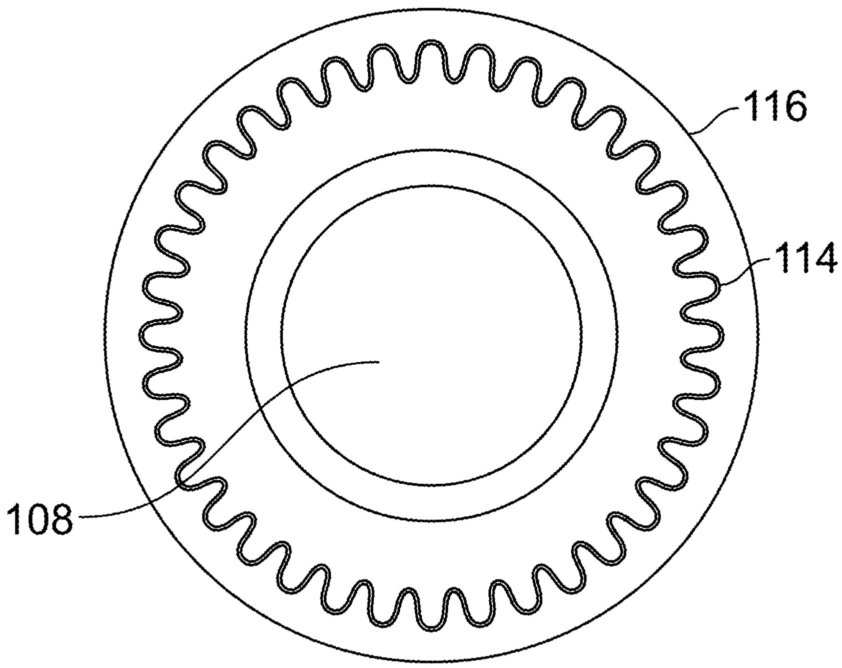
FIG. 4 depicts a top view of the threaded insert.
Figure 5:
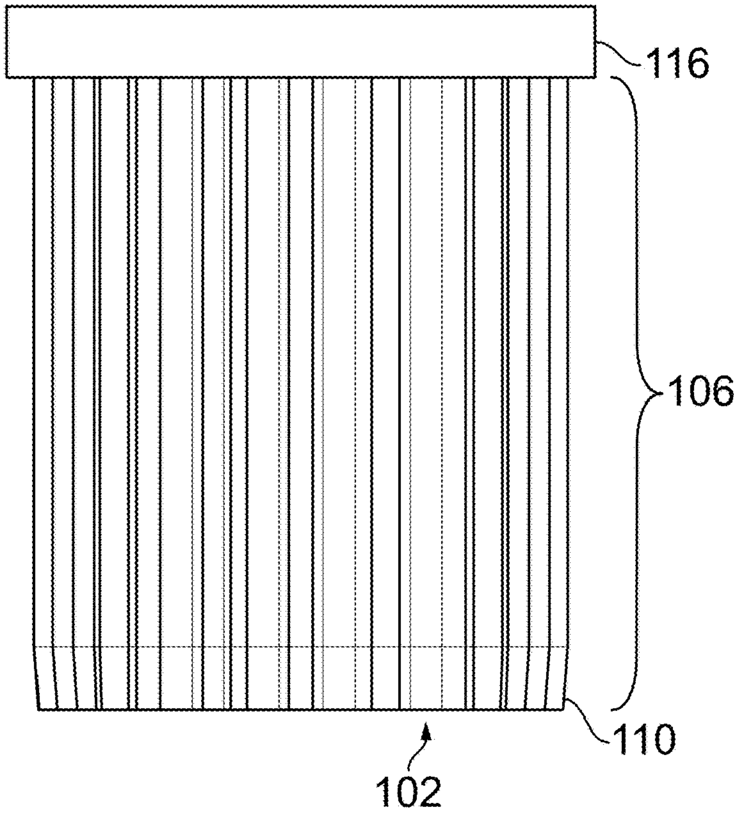
FIG. 5 depicts a second side view of the threaded insert.

This disclosure as a whole may be best understood by reference to the following detailed description when read in conjunction with the accompanying drawings, drawing descriptions, abstract, background, field of disclosure, and associated headings. Identical reference numbers when found on different figures identify the same elements or a functionality equivalent element. The elements listed in the abstract are not referenced but nevertheless refer by association to the elements of the detailed description and associated disclosure.

The Insert

FIGS. 1-5 depict a threaded insert 100. The insert 100 has a top end 102, bottom end 104, and side wall 106 extending between the top end 102 and bottom end 104. The insert 100 is a generally cylindrical member with a hole 108 extending longitudinally therethrough. In an embodiment, the hole 108 includes an internal threading. In alternative embodiment, the hole 108 does not comprise internal threading.

As depicted in FIGS. 1-5, a lip 116 projects radially and outwardly from the bottom end 104 of the insert 100. In the preferred embodiment, the lip 116 is integral with and comprised of the same material as the sidewall 106.

As depicted in FIGS. 1-5, the top end 102 of the insert 100 is tapered 110, which assists with installing the insert 100 into the airfield light fixture 200. In an alternative embodiment, the top end 102 of the inset does not include a tapered portion. A plurality of protrusions 114 extend radially from the exterior side wall 106 of the insert 100 which assists with securing the insert 100 into place. In the embodiment depicted in FIGS. 1-5, the protrusions 114 comprise a plurality of splines.

In the preferred embodiment, and as depicted in FIG. 1, the interior side wall 112 of the insert 100 is threaded to receive bolts and secure the cover of the airfield light fixture to the container of the airfield light fixture.

In a preferred embodiment, the tapered portion 110 forms a five degree angle with the side wall 106 of the insert 100. In the preferred embodiment, the tapered portion 110 includes a plurality of protrusions 114 of similar shape as the protrusions 114 extending from the exterior side wall 106. In the preferred embodiment, the tapered portion is about 0.0750 in. in length. In alternative embodiments, other configurations of the tapered portion are considered.

The insert 100 may be manufactured to comply with an airfield light container 200 fixture having holes of any size. In a first embodiment of the insert 100, the insert has a length of about 0.4550 in. from the lip 116 to the top end 102, an outside sidewall 106 diameter of about 0.5 in. (without the protrusions 114), a protrusion extending the length of up to 0.036 in. away from the side wall 106, and an interior sidewall 106 diameter of about 0.375 in. In this embodiment, the diameter of the lip 116 is approximately 0.6875 in. and has a thickness of about 0.0800 in.

In a second embodiment of the insert 100, the insert has a length of about 0.8300 in. from the lip 116 to the top end 102, an outside sidewall 106 diameter of about 0.5 in. (without the protrusions 114), a protrusion extending the length of up to 0.036 in., and an interior sidewall thickness of about 0.375 in. In an alternative embodiment, the diameter of the lip 116 is approximately 0.6875 in. and has a thickness of about 0.0787 in.

In another embodiment, the outside sidewall 106 has a diameter of about 10 mm. Other embodiments are considered which allow for universal installation of the insert 100 into airfield light fixtures 200.

The insert 100 of the present disclosure is comprised of thermoplastics, composites, metals, or the like (including but not limited to Carbon Steel and/or Stainless Steel). Many inserts currently in use in the art are made from Carbon Steel. In a preferred embodiment, the insert 100 of the present disclosure is made from 316 Stainless Steel.

Inserts currently in use with airfield light fixtures do not include a tapered barrel. In the preferred embodiment of the present disclosure, the barrel of the insert 100 is tapered to assist with drilling the insert 100 into the container of the airfield light fixture 200.

Inserts currently in use in the art typically have an exterior sidewall diameter of 17⁄32" (without protrusions). In an embodiment of the present disclosure, the insert 100 has an exterior sidewall thickness of ½" (excluding protrusions 114). This provides additional space for protrusions 114 and allows the inserts 100 to include protrusions 114 with longer splines. In effect, the longer splines prevent stripping and lock the insert 100 into the airfield light fixture 200 more effectively.

In the preferred embodiment of the present disclosure, the protrusions 114 extend up to 0.036 in. from the exterior sidewall 106 of the insert 100. The protrusions 114 of the present disclosure cut deeper and are spread wider apart than the inserts 100 in the prior art. The insert 100 of the present disclosure locks more effectively into the airfield light fixture 200 and prevents rotation of the insert 100 when torquing a bolt. The insert 100 of the present disclosure also prevents stripping or destruction of the hole 210 in the airfield light fixture 200 (i.e., it prevents a user from making the hole 210 larger than the insert 100 itself during installation).

The Airfield Light Fixture

Figure 6A:
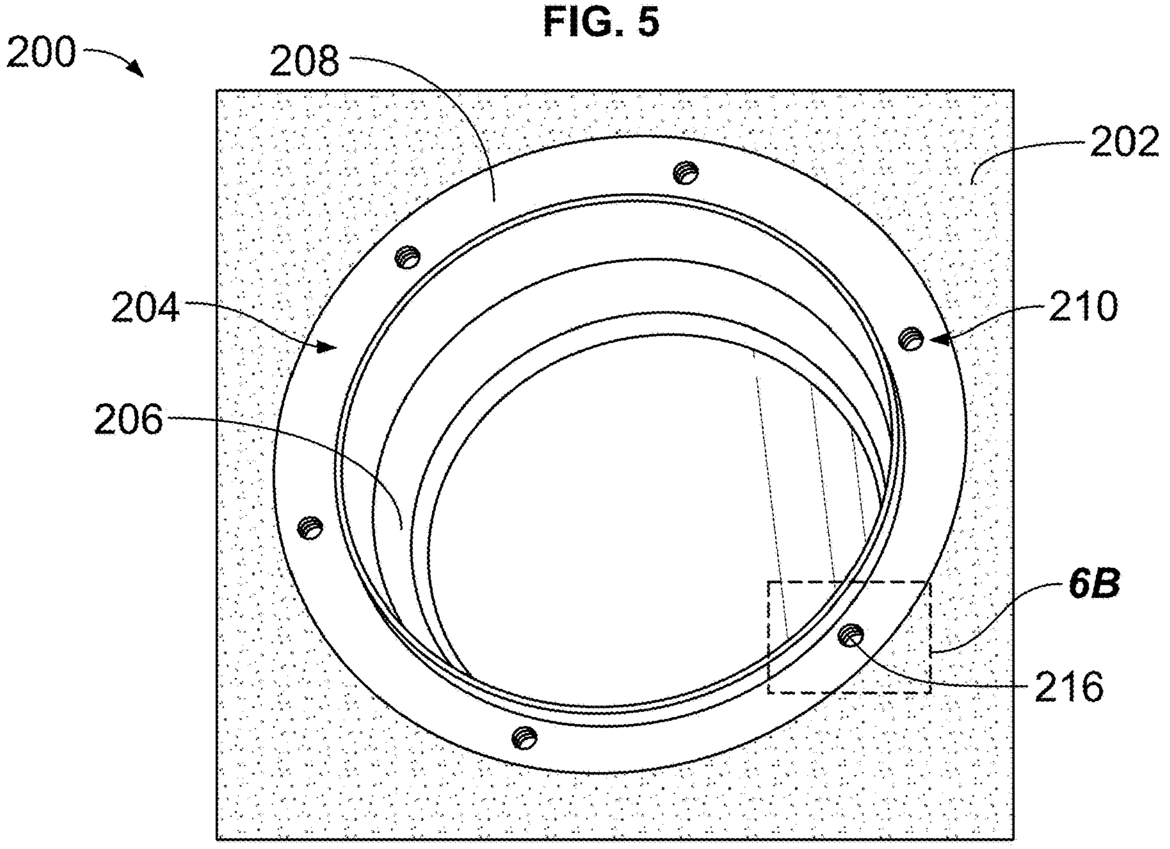
FIG. 6*a* depicts the container portion of a light fixture base can embedded in pavement.
Figure 6B:
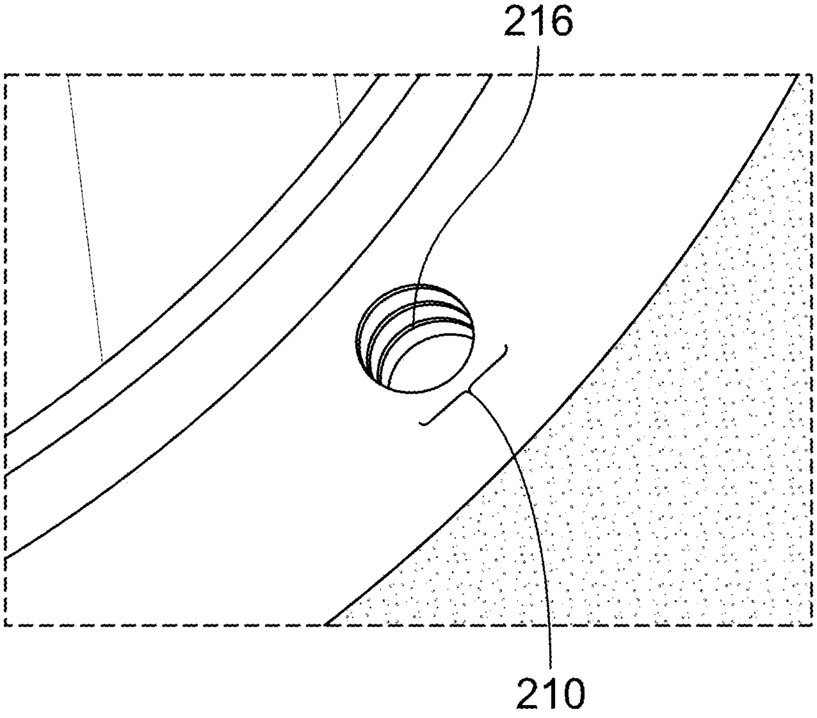
FIG. 6*b* depicts a close up view of a portion of the light fixture base can of FIG. 6*a*.
Figure 7:
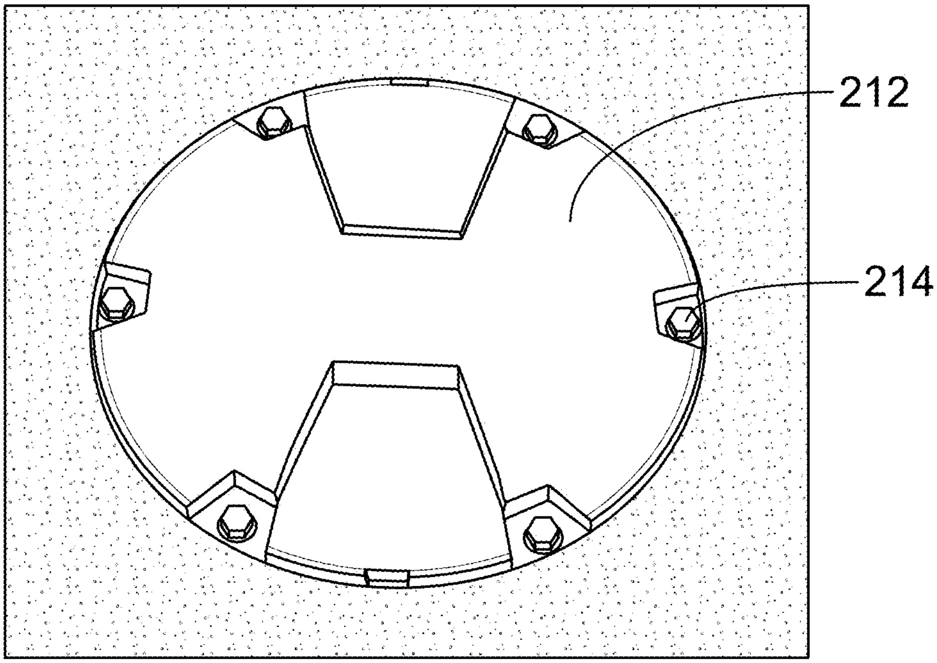
FIG. 7 depicts the container and cover of the airfield light fixture bolted into the pavement.

FIGS. 6 and 7 depict a standard airfield light fixture 200. An airfield light fixture 200 is typically installed in the ground 202 such as the pavement of an airfield runway. The light fixture 200 generally comprises a base can 204 with a container 206 and flange 208 portion. The container portion 206 includes a generally cylindrical side wall with an upper and lower end. A flange 208 is mounted on the upper end of the side wall and extends outwardly and radially therefrom. A plurality of threaded holes 210 are spaced apart along the perimeter of the flange 208, the holes 210 are often designed with threading 216 to receive a standard bolt 214.

Each base can 204 has a corresponding cover 212 which is generally circular in shape and sized to cover the open upper end of the base can 204. The cover 212 includes a plurality of holes positioned for alignment with the threaded holes 210 in the base can 204.

The cover 212 is secured to the base can 204 by aligning the holes of the cover and the holes 210 and securing said bolts 214 into the holes 210.

Method of Use

Figure 8:
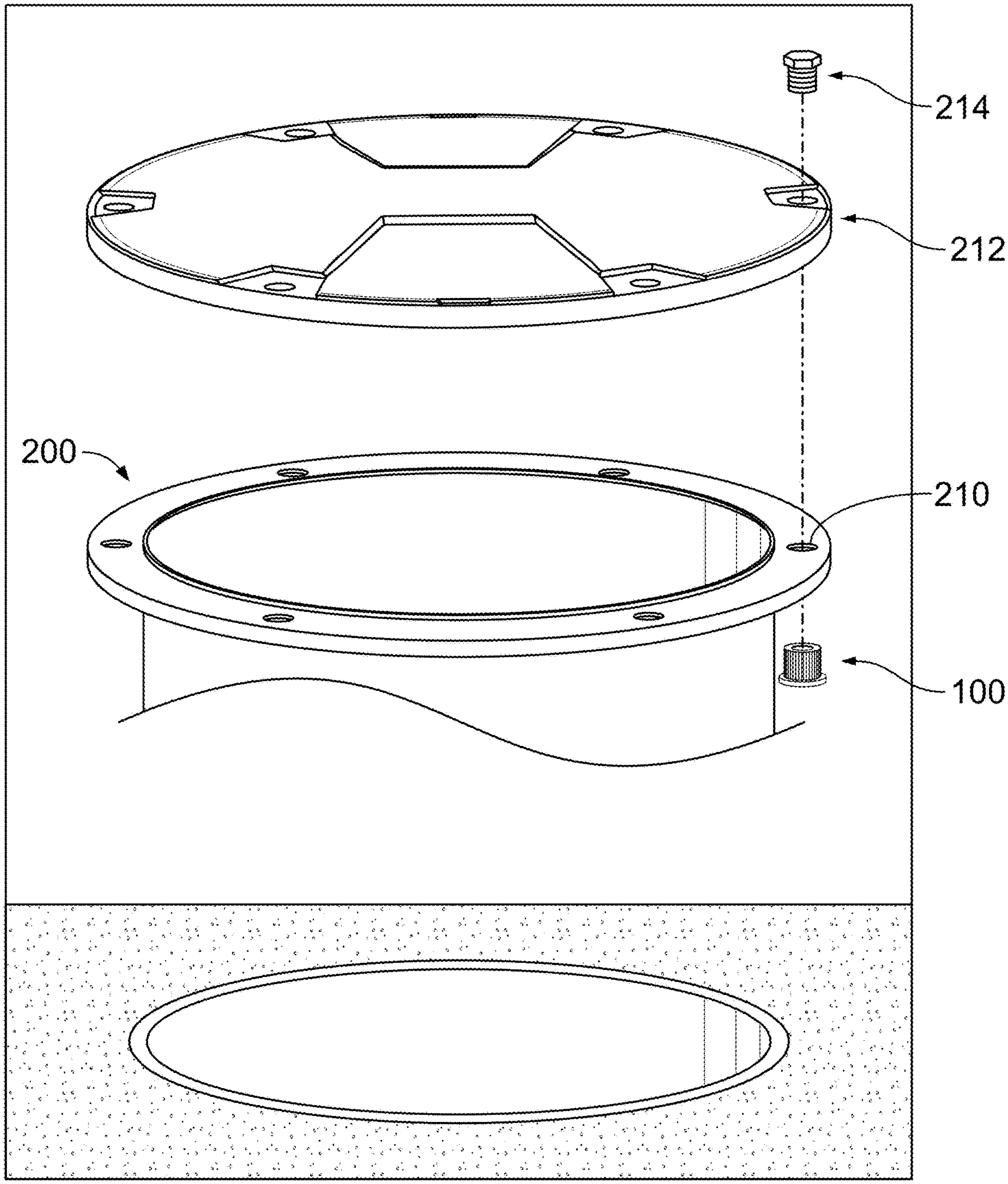
FIG. 8 depicts an exploded view of the airfield light fixture, a bolt, and threaded insert.
Figure 9:
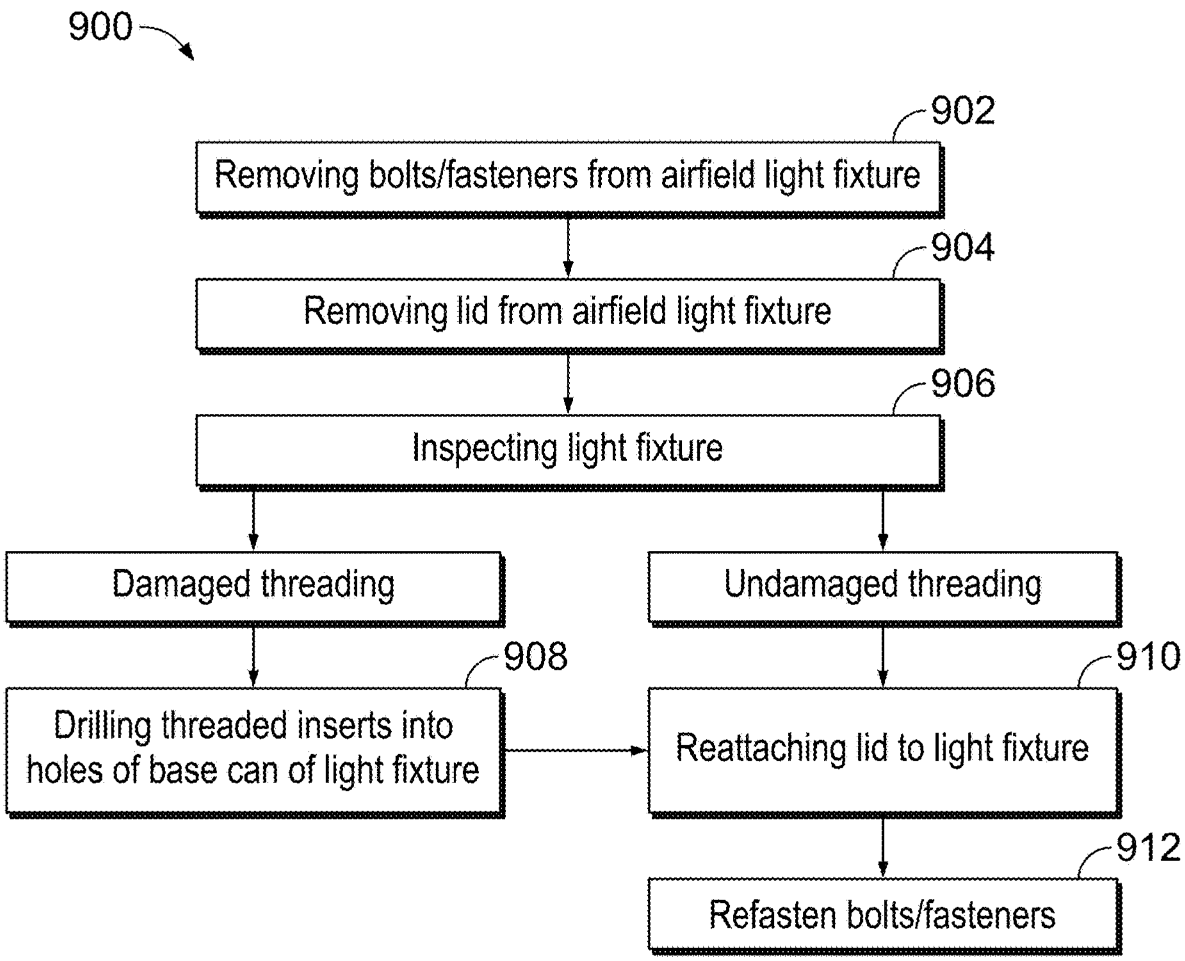
FIG. 9 depicts a flow diagram of the steps of using the threaded insert.

FIG. 8 depicts an exploded view of the airfield light fixture, a bolt, and threaded insert. FIG. 9 depicts a flow diagram of the method of using the threaded inserts 100 of the present disclosure 900. Over time, the threading 216 within the holes 210 may become stripped or damaged. The threaded inserts 100 allow a user to repair or replace the threading within a light fixture 200 quickly and easily.

In a first step 902, a user may remove the bolts 214 from the holes 210 of the airfield light fixture. In a second step 904, a user removes the cover/lid 212 from the top of the base can 204 of the airfield light fixture. The base can 204 is removable from the ground and is not fixed to the airfield runway 202. Once the lid 212 is removed, a user can access the interior of the airfield light fixture to make any necessary repairs to the light fixture itself or to the electrical components therein. In a third step, the user inspects the holes 210 to determine whether the threading 216 has been damaged.

If the threading has been damaged, the user proceeds to a fourth step 908 and drills a threaded insert 100 into any holes 210 having damaged threads 216. In a preferred embodiment, the threaded insert 100 is drilled upward from the bottom of each hole 210. In a fifth step 910, the user places the cover/lid 212 on top of the base can 204 of the light fixture. In a final step 912, the user can reapply the bolts 214 to the holes 210 (at least some of which now include the threaded inserts 100) to secure the light fixture in place 912.

If the threading 216 within the holes 210 has not been damaged or stripped, the user may elect to simply reattach the lid to the light fixture 910 and refasten the bolts 214 to the holes 210. In alternative embodiments, even if the threading 216 of the holes 210 has not been damaged, a user may elect to apply the threaded inserts 100 to the holes.

The walls of the threaded insert 106 include a plurality of protrusions 114 (i.e., ribbed splines). The walls of the threaded insert 106 (with the ribbed splines) are slightly larger in diameter than the holes 210. When the insert is drilled into the hole 210, the splines cut into the 208 and lock the insert 100 in place. Once the insert 100 is in place, a user can secure a bolt 214 within the interior threading 112 of the insert 100. The lip 116 of the insert 100 contacts the lower face of the flange 208 to prevent the insert from being removed through the upper face of the flange 208 if the user later tries to remove the bolt 214.

It is understood that the preceding is merely a detailed description of some examples and embodiments of the present invention and that numerous changes to the disclosed embodiments may be made in accordance with the disclosure made herein without departing from the spirit or scope of the invention. The preceding description, therefore, is not meant to limit the scope of the invention, but to provide sufficient disclosure to allow one of ordinary skill in the art to practice the invention without undue burden.

What is claimed is:

1. A threaded insert comprising:

a main body having a threaded inner surface and a ribbed outer surface;

an opening at a first end of the main body, wherein the diameter of the opening is defined by an inner surface of the main body; and a flange extending from an opposing end of the main body;

wherein the ribbed outer surface is formed by a plurality of protrusions extending radially from the main body;

wherein the ribbed outer surface further comprises a plurality of valleys disposed between the plurality of protrusions;

wherein each of the plurality of protrusions are radially aligned and extend up to 0.036 inches beyond the radii of the plurality of valleys.

2. A threaded insert comprising:

a main body having a threaded inner surface and a ribbed outer surface;

an opening at a first end of the main body, wherein the diameter of the opening is defined by an inner surface of the main body; and a flange extending from an opposing end of the main body;

wherein the ribbed outer surface is formed by a plurality of protrusions extending radially from the main body;

wherein the plurality of protrusions include a tapered edge proximate the first end of the main body.

3. The threaded insert of claim 2, wherein the tapered edge forms up to a six degree angle.

4. The threaded insert of claim 2, wherein the opening is a through hole extending through the main body and flange.

5. A threaded insert comprising:

a main body having a threaded inner surface and a ribbed outer surface;

an opening at a first end of the main body, wherein the diameter of the opening is defined by an inner surface of the main body; and a flange extending from an opposing end of the main body;

wherein the opening is a hole which forms a cavity between the inner surface of the main body and the flange; and wherein the diameter of the cavity is approximately 0.375 inches.

6. The threaded insert of claim 2, wherein the flange has a diameter greater than the diameter of the main body.

* * * * *